April 10, 1928.  B. A. SLOCUM  1,665,481

PHOTOGRAPHIC FILM CARTRIDGE

Filed Oct. 30, 1925

INVENTOR
BENJAMIN A. SLOCUM

BY
Philip S. Hopkins
ATTORNEY

Patented Apr. 10, 1928.

1,665,481

UNITED STATES PATENT OFFICE.

BENJAMIN A. SLOCUM, OF BINGHAMTON, NEW YORK, ASSIGNOR TO ANSCO PHOTO-PRODUCTS, INC., OF BINGHAMTON, NEW YORK.

PHOTOGRAPHIC-FILM CARTRIDGE.

Application filed October 30, 1925. Serial No. 65,739.

This invention relates to photographic film cartridges of the type ordinarily used in cameras and usually comprising a strip of sensitized film interwound with a strip of protective material, upon a spool provided with end flanges.

The principal object of my invention is to provide means for preventing the leaking of light between the spool flanges and the edges of the sensitized film.

It is well known that in film cartridges of the ordinary type there is frequently a slight space between the flanges of the spool and the edges of the protective material interwound with the film. These spaces permit light to enter past the protective material and reach the edges of the sensitized film causing what is known as edge fog. This condition may be brought about in many ways, as for instance, by shrinkage of the protective material after the same is spooled, loose spooling, loose flanges, or inaccurate cutting of the edges of the protective material.

It is my object to eliminate this light leakage by forming the marginal edges of the protective material, beyond the edges of the sensitized film with a V groove.

A further object and advantage of this invention is that the V groove so formed is a guide in the spooling operation and thus enables the film and protective materials to be more rapidly and more accurately spooled. This is an advantage both in the original spooling of the film and in the subsequent winding and unwinding thereof as the film passes through a camera.

Other objects and advantages will be apparent as the description proceeds.

Referring now to the drawing wherein like reference numerals indicate like parts.

Figure 1:
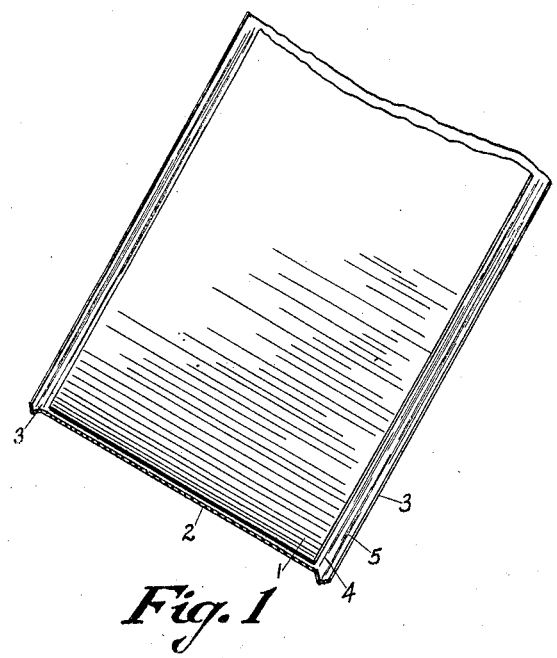
Figure 1 is a perspective of a strip of film and protective covering showing clearly the grooves in the edges of the protective material beyond the sensitized film.

It will be noted with reference to Figure 1 that the sensitized film 1, is considerably less in width than the protective material 2. In that portion of the protective material extending beyond the edges of the sensitized film 1, I have formed longitudinal grooves 3, running the full length of the protective material, such V grooves or channels extending to a depth equal to or greater than the combined thicknesses of the protective material and sensitized film. Attention is here called to the fact that as clearly illustrated, the V grooves 3 are not merely indentations or undulations in the edges of the protective material, but are sharply defined grooves having the inclined sides 4 and 5 extending sharply upwardly from the trough of the groove.

It will be noted that the edges of the film 1 lie slightly within the boundary of the protective material defined by the uppermost edges of the sides 4 of the grooves. The sensitized film therefore does not interfere in any way with the proper tracking, one within the other, of the grooves as the material is wound upon the spool 6.

The protective material 2 is slightly wider overall than the distance between the flanges 7 of the spool. The forming of the grooves 3 however reduces the width of the protective material to a point where it is substantially of the same width as the distance between the flanges 7. This results in the outer side 5 of the groove 3 resting upon and contacting with, at their uppermost edges, the inner faces of the flanges 7. It should be noted in this connection that due to the natural "springy" tendency of the protective material, usually paper, this contact is a natural one.

This contact ordinarily prevents any light leaking downwardly between the inner faces of the flanges 7 and the edges of the protective material. Thus a very effective light lock is already formed for the edges of the sensitized film.

Figure 2:
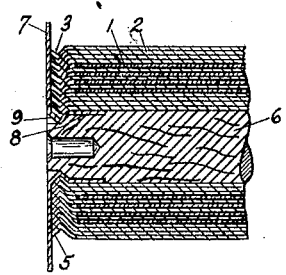
Figure 2 is a cross section of part of a spool showing the film and protective material wound thereon, and showing the function and operation of the V light lock.

However, a still further lock against the leaking of light in this manner is provided by making the grooves 3 deep enough so that, as shown clearly in Figure 2, the sides and trough thereof are brought one within the other as the protective material is wound about the spool. At each convolution the grooves 3 extend downwardly beyond the next adjacent edge of the sensitized film and into the next adjacent groove. This arrangement effectively prevents any light from reaching the edges of the sensitized film even though, due to faulty construction or spooling, a space should be left between the inner spaces of the flanges 7 and the edges of the protective material 1 whereby light might be admitted between the flanges and the edges of the protective material.

It will be understood that in spooling the film and the protective material, the grooves 3 have a tendency to follow one into the other as the convolutions are made upon the spool and are thus guided into true alignment between the flanges 7. The same action obviously occurs during the winding of the film through a camera.

In order to accommodate the V groove 3, the spool 6 or the hub 8 of the flange 7 may be also provided with a circular V groove 9.

From the foregoing it will be apparent that I have devised a simple, cheap and effective method of preventing edge fog to photographic film cartridges, by the use of a V groove in the edges of the protective material, the outer side of the V groove constituting the extreme edges of the protective material and forming not only a light lock, but a guiding means for the winding of the cartridge. It will be obvious that changes in detail may be made without departing from the spirit of the invention. I do not limit myself therefore to the exact construction shown and described other than by the appended claim.

I claim:—

A film cartridge comprising a spool provided with spaced flanges and having interwound strips of sensitized film and protective material thereon, said material being wider than said film, and single longitudinal V grooves adjacent the edges of said material beyond the edges of said film, the outer sloping sides of said grooves terminating at the edges of said protective material and bearing against said flanges.

BENJAMIN A. SLOCUM.